J. W. DUNN.
Vine-Rake.

No. 162,277.

Patented April 20, 1875.

WITNESSES:
Chas. Nida
A. T. Terry

INVENTOR:
J. W. Dunn
BY
ATTORNEYS.

THE GRAPHIC CO.PHOTO-LITH.39 & 41 PARK PLACE, N.Y.

UNITED STATES PATENT OFFICE.

JOSEPH W. DUNN, OF CORPUS CHRISTI, TEXAS.

IMPROVEMENT IN VINE-RAKES.

Specification forming part of Letters Patent No. 162,277, dated April 20, 1875; application filed February 13, 1875.

*To all whom it may concern:*

Figure 1:
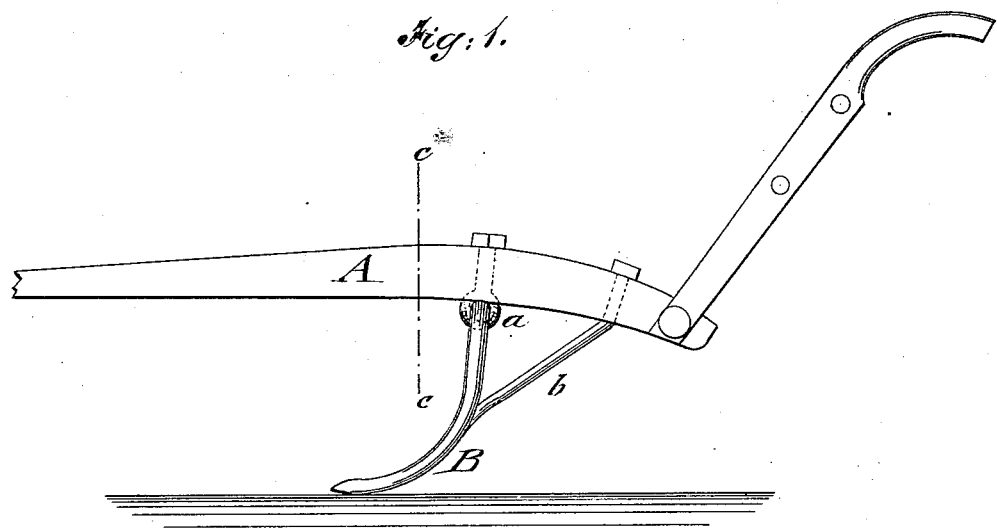
Figure 2:
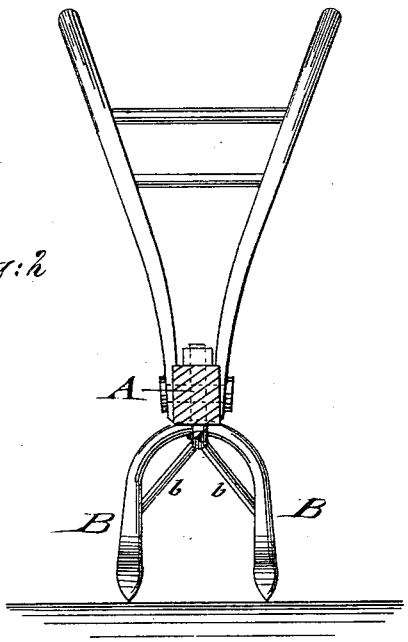

Be it known that I, JOSEPH W. DUNN, of Corpus Christi, in the county of Nueces and State of Texas, have invented a new and Improved Vine-Rake, of which the following is a specification:

In the accompanying drawings, Figure 1 represents a side elevation of my improved vine-rake; and Fig. 2, a vertical transverse section of the same on the line $c\ c$, Fig. 1.

Similar letters of reference indicate corresponding parts.

My invention relates to an improvement for pulling off sweet potatoe and other vines from the ridges, preparatory to the digging and plowing of the ground.

The invention consists of a forward-curved fork or double-toothed rake, attached by eyebolt and braces to a common plow-beam.

In the drawing, A represents a supporting plow-beam, with lever-handles of the usual construction, which is provided, in place of the plow stock and share, with a fork or rake, B, having two forward-curved teeth. The fork or rake B is attached to the plow-beam by a central eyebolt, $a$, and rear braces $b$, as indicated in Fig. 1, so as to sustain the rake rigidly thereon.

The vine-rake is drawn by a span of animals, like a plow, one on each side of the ridge to be cleaned of vines, the operator placing the beam of the rake directly over the top of the ridge, with the teeth on the sides of the drill or base of the vines. The team is then moved forward, so that the teeth pass under the vines and tear them loose from the ground, carrying them along until the rake becomes choked or full. The team is then stopped and the rake pulled back and raised over the drift of vines, being then started again by lowering the rake for clearing another section, and so on through the whole row and field, furnishing thus a very effective and useful implement for agricultural purposes.

Having thus described my invention, I claim as new and desire to secure by Letters Patent—

The combination, with beam A of the fork B B, pivoted in beam-eye $a$, and provided with braces $b\ b$, all constructed and arranged substantially as and for the purpose specified.

JOSEPH W. DUNN.

Witnesses:
S. T. FOSTER,
DANL. DAVID.